Dec. 19, 1950        K. E. LYMAN        2,534,921
AUTOMOBILE DOME LIGHT
Filed May 8, 1947
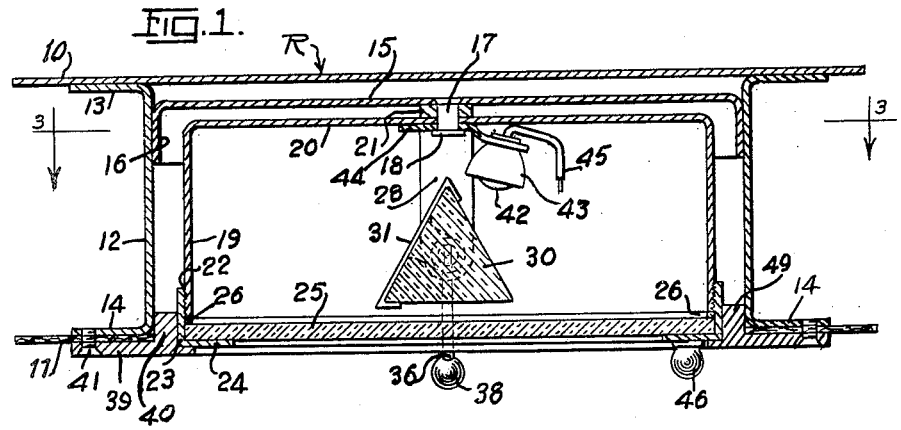
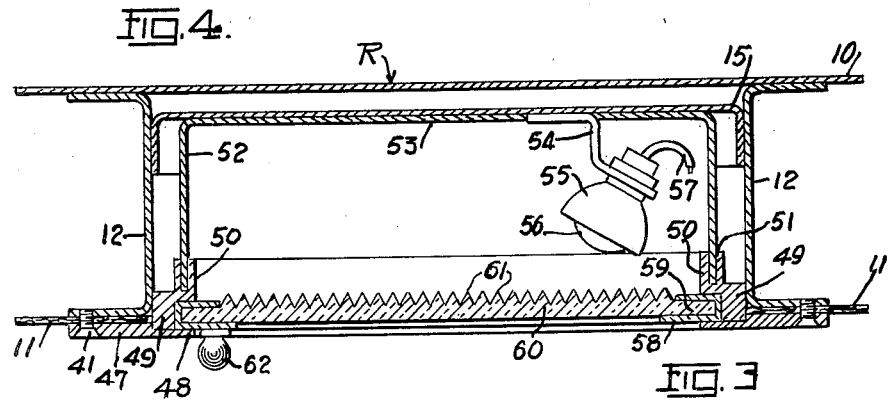
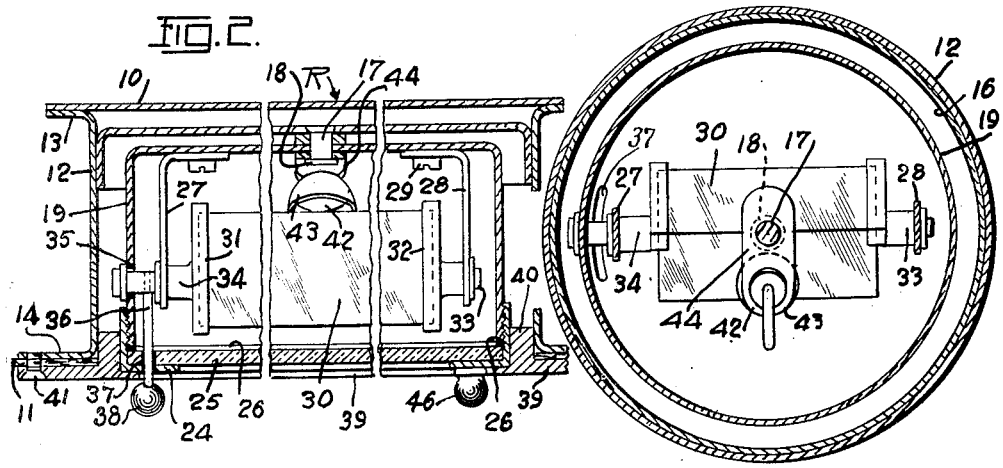
INVENTOR
KENNETH E. LYMAN
BY
Toulmin & Toulmin
ATTORNEYS Patented Dec. 19, 1950

2,534,921

UNITED STATES PATENT OFFICE 2,534,921

AUTOMOBILE DOME LIGHT

Kenneth E. Lyman, Lake Forest, Ill., assignor to Tucker Corporation, Chicago, Ill., a corporation of Delaware Application May 8, 1947, Serial No. 746,803

3 Claims. (Cl. 240—7.35)

1

This invention relates to the lighting of the interior of an automobile body of a closed type and is concerned primarily with the dome light usually included in such a car body.

At the present time it is common practice to provide a closed automobile body with a dome light which is fixedly mounted and which is intended to provide substantially all of the illumination for the interior of the car. While such a dome light might be considered as generally satisfactory, there are times when one occupant of the car has need of a good light so as to be able to inspect reading material such as a road map, and the same concentration would be of no use to the other occupants.

The present invention is predicated on the belief that decided advantages will attach to a dome light which may be adjusted to throw a concentrated beam anywhere within the interior of the car.

Accordingly, this invention has in view as its foremost objective the provision, in a closed automobile body, of a dome light which may be adjusted to throw a concentrated beam anywhere within the car.

More in detail, the invention has as an object the provision, in an automobile, of a dome light assembly which includes a fixed lamp together with light refracting instrumentalities which may be adjusted to throw the beam of light coming from the lamp to any particular location within the car body.

To the end of attaining a high degree of adjustment, the invention proposes to provide a dome light having two independent adjustments so that the beam of light coming therefrom may be more accurately directed to a desired location. In carrying out this idea, a light assembly is rotatably mounted on the under face of the roof of the car body. This assembly includes a lamp together with the usual reflector, and a light refracting member in the form of a prism which is adjustable so that as the prism is adjusted the angle of the beam with respect to the true vertical may be varied as occasion demands.

Moreover, by rotating the entire assembly, the beam may be adjusted as to horizontal direction. With these two adjustments, a high degree of accuracy as to directing the beam is obtained.

Various other more detailed advantages and objects of the invention such as arise in connection with carrying out the above noted ideas in a practical embodiment, will in part become apparent and in part be hereinafter stated as the description of the invention proceeds.

The invention, therefore, comprises an auto-

2 mobile dome light having two distinct adjustments for directing the beam of light therefrom to any desired location in the interior of a car body.

For a full and more complete understanding of the invention, reference may be had to the following description and accompanying drawing, wherein:

Figure 1 is a vertical section through a dome light designed in accordance with the precepts of this invention and that part of an automobile body roof in which it is mounted;

Figure 2 is a vertical sectional view taken substantially normal to the showing of Figure 1;

Figure 3 is a horizontal section looking from the top, being taken about on the plane represented by the line 3—3 of Figure 1; and Figure 4 is a sectional showing similar to Figure 1, but of a modified form of the invention.

Referring now to the drawing and first more particularly to Figures 1 and 2, the roof of a car body is depicted generally at R. The roof R includes an outer shell 10 and an inner lining 11 which is spaced therefrom. The inner lining 11 is formed with an opening at any appropriate location although it preferably will be centrally of the car body, and a cylindrical casing 12 is mounted in this opening.

It will be noted that the casing 12 has outturned ring-like flanges 13 and 14 which are anchored to the outer shell 10 and inner lining 11 so as to effectively hold the casing in position.

A circular plate 15 having a peripheral flange 16 is fixedly mounted within the casing 12 and is slightly spaced from the outer shell 10 as illustrated. This condition may be achieved by a pressed fit between the flange 16 and the casing 12, or in any other desired manner. A pivot pin 17 is carried by the plate 15 centrally thereof, and the lower end of the pin 17 is enlarged to provide an outwardly extending flange 18 for a purpose to be later described.

A cup-shaped housing defined by a cylindrical wall 19 and a flat top wall 20 is rotatably suspended from the pin 17, and it will be noted that a spacing washer 21 may be interposed between the plate 15 and wall 20 to insure of good rotative action. Adjacent to its lower outer edge, the cylindrical wall 19 is exteriorly threaded as shown at 22 and a retaining ring 23 having an inwardly extending lip 24 is screwed onto the threads 22.

A clear lens 25, having no appreciable refractive properties, is held assembled on the housing by this flange 24. It will be noted that the lens 25 is interposed between the flange 24 and the lower free edge of the cylindrical wall 19. A packing ring 26 may be employed to space the lens 25 from the edge of the wall 19.

A pair of brackets 27 and 28 are anchored to the under face of the flat wall 20 of the housing as by the screw fasteners shown at 29. These brackets 27 and 28 are located diametrically opposite to one another and they each include a depending vertical arm that is formed with a journal opening adjacent to its lower end.

A prism 30 is carried between two end members 31 and 32. The end member 32 carries a shaft 33 which is journaled in the bracket 28, while the end member 31 carries a shaft 34 that is journaled in the bracket 27 and passes through an opening 35 formed in the cylindrical wall 19.

At this point it is well to note that the bracket 27 is spaced from the wall 19 an appreciable distance so as to accommodate an arm 36 which is drivably mounted on the shaft 34 and which extends downwardly on the inside of the wall 19. This arm passes through a slot 37 formed in the lens 25 and flange 24. The lower end of the arm 36 carries an operating member in the form of a knob 38 which may be availed of to rock the arm and thereby rotate the stub shafts 33 and 34 and the prism 30 carried thereby.

The supporting ring 39 has a cylindrical projection 40 which extends a short distance up into the space between the casing 12 and the retaining ring 23. The outer portion of this supporting ring 39 is anchored to the lining 11 in any preferred manner, as by the screw fastener shown at 41. The inner lip of the ring 39 extends beneath the flange 24 and serves to support the housing 19—20 and the instrumentalities supported therein. It is evident that relative rotation between the supporting ring 39 and the housing is accommodated.

A light source in the form of a lamp 42 which is mounted within a reflector 43 is provided. This reflector is carried by a bracket arm 44 which is supported by the pin 17. An electrical cable 45 leads to a suitable source of current supply. It is important to note that the lamp 42 does not rotate with respect to the housing 19—20 because it moves therewith and retains the same relative position with respect to the prism 30.

A suitable operating member for rotating the housing 19—20 is provided in the form of a knob 46 which may be mounted on the under side of the flange 24 in a position in which it is readily accessible.

While the operation of the above described mechanism is believed to be obvious, it may be noted that with the lamp 42 receiving current, a beam of light is thrown from this lamp and the reflector 43 on to the prism 30. Due to the refracting qualities of the latter, this beam of light will emerge from the prism and assume a direction which depends on the relative position to which the prism has been adjusted on its axial mounting.

Thus, an operator, by availing of the knob 38, may rock this prism and achieve a desired angle of deviation from the vertical of this light beam. The operator may also avail of the knob 46 and rotate the entire housing to cause this beam to be directed at any desired horizontal angle.

*The modification*

A somewhat modified and more simplified form of the invention is disclosed in Figure 4. In this species the roof R, outer shell 10, inner lining 11, casing 12, and plate 15 remain substantially the same as that above described.

Anchored to the inner lining 11 is a supporting ring 47 having an inwardly projecting lip 48. Resting on this lip 48 is a ring 49 which engages the inner surface of the casing 12. This ring 49 carries an inwardly offset, upwardly extending flange 50 formed with a groove 51. A cup-shaped housing comprises a cylindrical wall 52 and a flat top wall 53 and is positioned with its lower free edge received in the groove 51 and the upper face of the wall 53 engaging the under face of the plate 15.

The flat wall 53 carries a bracket 54 which, in turn, carries a reflector 55 in which is mounted a lamp 56, and from which an electric cable 57 extends to a suitable source of current supply.

It will be noted that the lip 48 together with the ring 49 and offset flange 50 define an annular groove. A lens carrier 58 is rotatably positioned within this groove, and received in this carrier is the peripheral flat edged portion 59 of a refracting lens 60. The inner surface of the latter is formed with a plurality of prismatic faces 61 which are designed to cooperate with light coming from the lamp 56 and reflector 55. An operating member in the form of a knob 62 may be mounted on the under face of the carrier 58.

It is evident that an operator may avail of this knob 62 and rotate the refracting lens 60. Thus, the angular relation between the prismatic faces 61 and the light beam from the lamp 56 and reflector 55 may be adjusted whereby the direction of light emerging from the lens 60 is correspondingly adjusted.

While preferred specific embodiments of the invention are hereinbefore set forth, it is to be clearly understood that the invention is not to be limited to the exact construction illustrated and described, because various modifications of these details may be provided in putting the invention into practice within the purview of the appended claims.

What is claimed is:

1. In an automobile dome light, a housing, pivot means for rotatably mounting said housing in the roof of an automobile for rotation about a vertical axis, a light source carried by said housing, a prism carried by said housing and rotatably mounted on a horizontal axis normal to said pivotal mounting, and means including a lever projecting below the housing to rock said prism relative to said light source.

2. In an automobile including a roof consisting of an outer shell and an inner lining, a dome light comprising a cylindrical casing secured to said shell and lining, a horizontal plate carried by the upper part of said casing, a housing pivotally mounted on the under face of said plate for rotation on a vertical axis, a light source within said housing, spaced brackets carried by said housing, a prism rotatably mounted on said brackets on a horizontal axis, a manual handle projecting below the housing to rock said prism, and a manual handle projecting below the housing to rotate said housing.

3. In an automobile including a roof consisting of an outer shell and an inner lining spaced therefrom, a dome light comprising a cylindrical casing secured to said shell and lining respectively, a horizontal plate carried by said casing and spaced from said outer shell, a housing having a cylindrical and a flat wall, a pivot associated with said plate and said flat wall for rotatably mounting said housing within said casing, a supporting plate carried by said inner lining and having an inner lip supporting said housing, a light source consisting of a lamp and a reflector within said housing, a prism rotatably mounted within said housing on an axis normal to said pivotal mounting, an operating member for rocking said prism, and an operating member for rotating said housing.

KENNETH E. LYMAN.

REFERENCES CITED

The following references are of record in the file of this patent:

UNITED STATES PATENTS

| Number | Name | Date |
|---|---|---|
| 1,308,858 | Norris | July 8, 1919 |
| 1,815,831 | Cassetty et al. | July 21, 1931 |
| 2,020,603 | Gearhart | Nov. 12, 1935 |
| 2,116,750 | Dashner | May 10, 1938 |
| 2,152,197 | Levy | Mar. 28, 1939 |
| 2,218,731 | Tuck et al. | Oct. 22, 1940 |
| 2,244,737 | Stewart | June 10, 1941 |
| 2,249,357 | Graham | July 15, 1941 |
| 2,285,002 | Wilson | June 2, 1942 |
| 2,307,977 | Wellman | Jan. 12, 1943 |
| 2,434,108 | Handler | Jan. 6, 1948 |

FOREIGN PATENTS

| Number | Country | Date |
|---|---|---|
| 193,988 | England | Mar. 6, 1923 |
| 606,316 | France | 1926 |